United States Patent
Ismail (10) Patent No.: US 10,516,998 B2
(45) Date of Patent: Dec. 24, 2019

(54) WIRELESS NETWORK AUTHENTICATION CONTROL

(71) Applicant: Hewlett Packard Enterprise Development LP, Houston, TX (US)

(72) Inventor: Akram Sheriff Ismail, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 126 days.

(21) Appl. No.: 15/459,818

(22) Filed: Mar. 15, 2017

(65) Prior Publication Data
US 2018/0206116 A1    Jul. 19, 2018

(30) Foreign Application Priority Data

Jan. 19, 2017  (IN) .............................. 201741002183

(51) Int. Cl.
*H04L 29/06*     (2006.01)
*H04W 12/08*    (2009.01)
*H04W 48/12*    (2009.01)
*H04L 12/927*   (2013.01)
*H04W 84/12*    (2009.01)
*H04L 12/911*   (2013.01)

(52) U.S. Cl.
CPC .......... *H04W 12/08* (2013.01); *H04L 47/808* (2013.01); *H04W 48/12* (2013.01); *H04L 47/824* (2013.01); *H04W 84/12* (2013.01)

(58) Field of Classification Search
CPC .................................................. H04W 12/04
See application file for complete search history.

(56) References Cited

U.S. PATENT DOCUMENTS

| 7,721,323 B2* | 5/2010 | Finn ........................ H04L 63/08 713/160 |
| 9,954,956 B2* | 4/2018 | Adrangi .................. H04W 4/70 |
| 2006/0227773 A1* | 10/2006 | Grewal ................. H04L 63/123 370/389 |
| 2009/0224906 A1* | 9/2009 | Balgard .............. H04L 41/0809 340/539.1 |
| 2013/0064247 A1* | 3/2013 | Song ................... H04L 12/4641 370/392 |
| 2013/0070627 A1 | 3/2013 | Chen et al. |
| 2013/0223279 A1* | 8/2013 | Tinnakornsrisuphap .................... H04L 41/0809 370/254 |

(Continued)

OTHER PUBLICATIONS

Khorov, E. et al.; "A Survey on IEEE 802.11ah: an Enabling Networking Technology for Smart Cities"; 2014; 17 pages.

(Continued)

*Primary Examiner* — Harris C Wang
(74) *Attorney, Agent, or Firm* — Hewlett Packard Enterprise Patent Department (57) ABSTRACT

In some examples, a method includes assigning, with an Access Point (AP) in a wireless network, a value for an Authentication Control Threshold (ACT) field in an advertisement packet that allows devices having a predetermined access control role to immediately attempt to associate with the AP. The method can further include transmitting, with the AP, the advertisement packet including the value for the ACT field for devices having the predetermined access control role.

13 Claims, 8 Drawing Sheets

(56) References Cited

U.S. PATENT DOCUMENTS

| | | | | |
|---|---|---|---|---|
| 2014/0254502 A1* | 9/2014 | Cai | ............... | H04W 48/20 |
| | | | | 370/329 |
| 2014/0335823 A1* | 11/2014 | Heredia | ............ | H04L 51/38 |
| | | | | 455/411 |
| 2015/0003358 A1* | 1/2015 | Wang | ............... | H04L 63/20 |
| | | | | 370/329 |
| 2015/0208451 A1* | 7/2015 | Tzoreff | ............ | H04W 76/14 |
| | | | | 370/329 |
| 2016/0112429 A1* | 4/2016 | Sundaresan | ......... | H04L 63/08 |
| | | | | 726/4 |
| 2016/0323689 A1* | 11/2016 | Goluboff | ........... | H04L 63/0823 |
| 2017/0353859 A1* | 12/2017 | Idnani | ............. | H04W 12/08 |
| 2018/0007140 A1* | 1/2018 | Brickell | ............ | H04L 67/125 |
| 2018/0206116 A1* | 7/2018 | Ismail | ............. | H04W 12/08 |

OTHER PUBLICATIONS

Sthapit, P. et al.; "Performance Analysis of Association Procedure in Ieee 802.11ah"; Nov. 2015; 4 pages.

Tian, L. et al.; "Implementation and Validation of an IEEE 802.11ah Module for NS-3"; Jun. 15, 2016; 9 pages.

Villegas E. et al.; "What Lies Beneath Wi-fi HaLow"; Jan. 28, 2016; 31 pages.

* cited by examiner

WIRELESS NETWORK AUTHENTICATION CONTROL

BACKGROUND

Wireless networking can allow wireless devices, such as certain smartphones, laptops, tablets, or other suitable computing devices, to exchange data with other wired or wireless devices. In some wireless networks, a wireless device can access a wired portion of the network via one or more access points. Such access points can be designed to communicate with wireless devices at one or more radio frequencies based on capabilities of network equipment or other factors.

DETAILED DESCRIPTION

The following discussion is directed to various examples of the disclosure. Although one or more of these examples may be preferred, the examples disclosed herein should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In some situations, a wireless network may experience a condition in which many devices attempt to associate with an Access Point (AP) at the same time. For example, following a power outage in a campus environment, thousands of Internet of Things (IOT) sensors may seek to associate with one or more APs. In such a situation, the devices may overload the AP, which may prevent certain mission-critical devices from timely associating with the AP. Although the use of RAW (Reserved Access Window) may limit a number of associated devices contending for a channel, it may not suitably improve channel access or effective airtime utilization during network initialization and association stages.

The present disclosure describes various implementations relating to wireless network authentication control. For example, in some implementations, a method can include: assigning, with an AP in a wireless network, a value for an Authentication Control Threshold (ACT) field in an advertisement packet that allows devices having a predetermined access control role (e.g., an access control role for IOT devices) to immediately attempt to associate with the AP; and transmitting, with the AP, the advertisement packet including the value for the ACT field for devices having the predetermined access control role.

Certain implementations of the present disclosure may allow for quick association of one type of device (e.g., WIFI-IOT sensors in some implementations) followed by association of other types of devices (e.g., laptops, tablets, and smartphones in some implementations). Certain implementations of the present disclosure can provide for reduced airtime utilization, which can, for example, have an impact on data traffic congestion during association or other times. Moreover, certain implementations may rely on existing Information Elements (IEs) provided in a beacon packet to influence devices to connect rather than relying on the use of a new IE, which may further result in more effective use of airtime. Other advantages of implementations presented herein will be apparent upon review of the description and figures.

Figure 1:
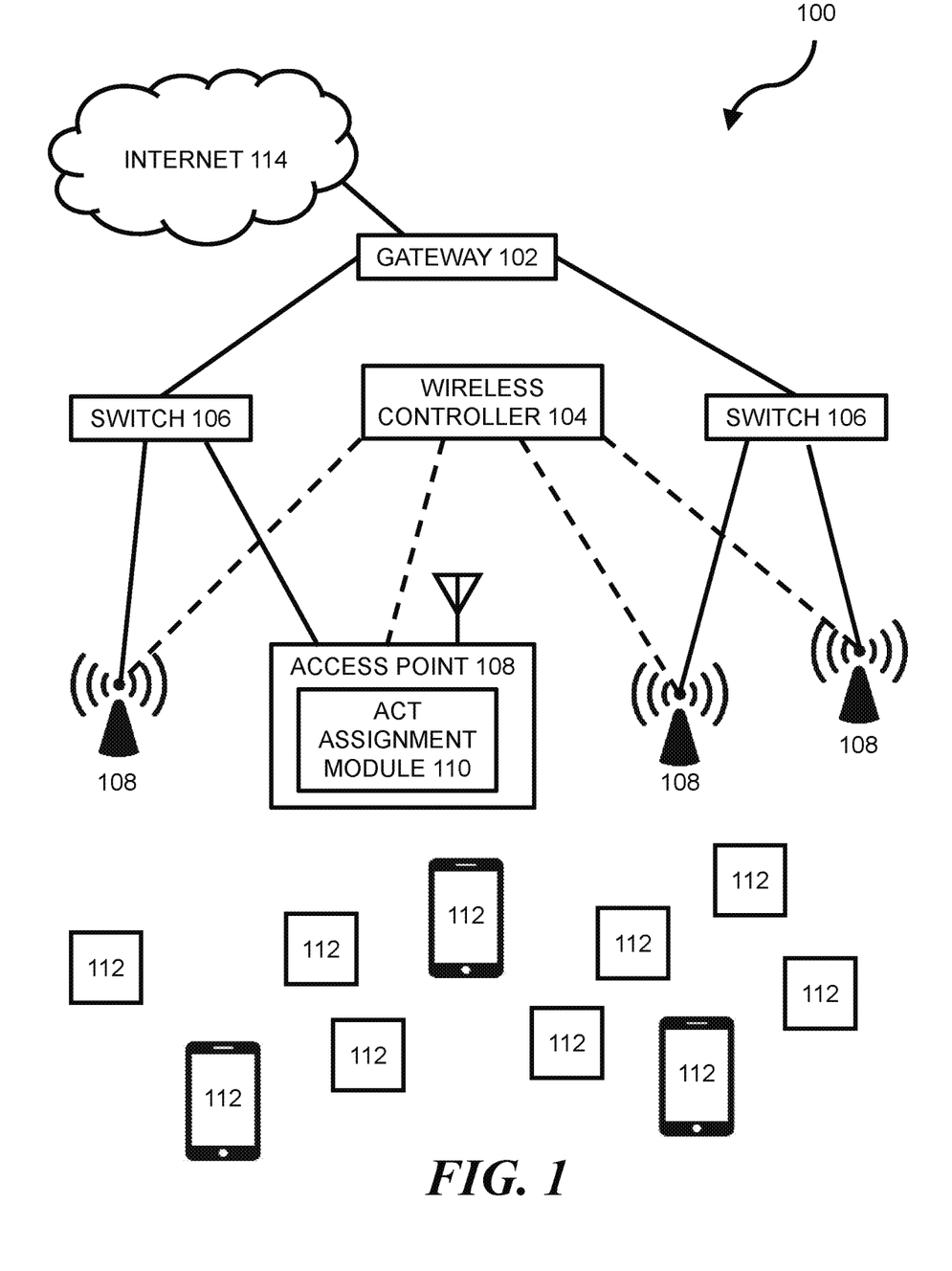
FIG. 1 is a diagram of a network environment including an access point including an authentication control threshold assignment module, according to an example.
Figure 2:
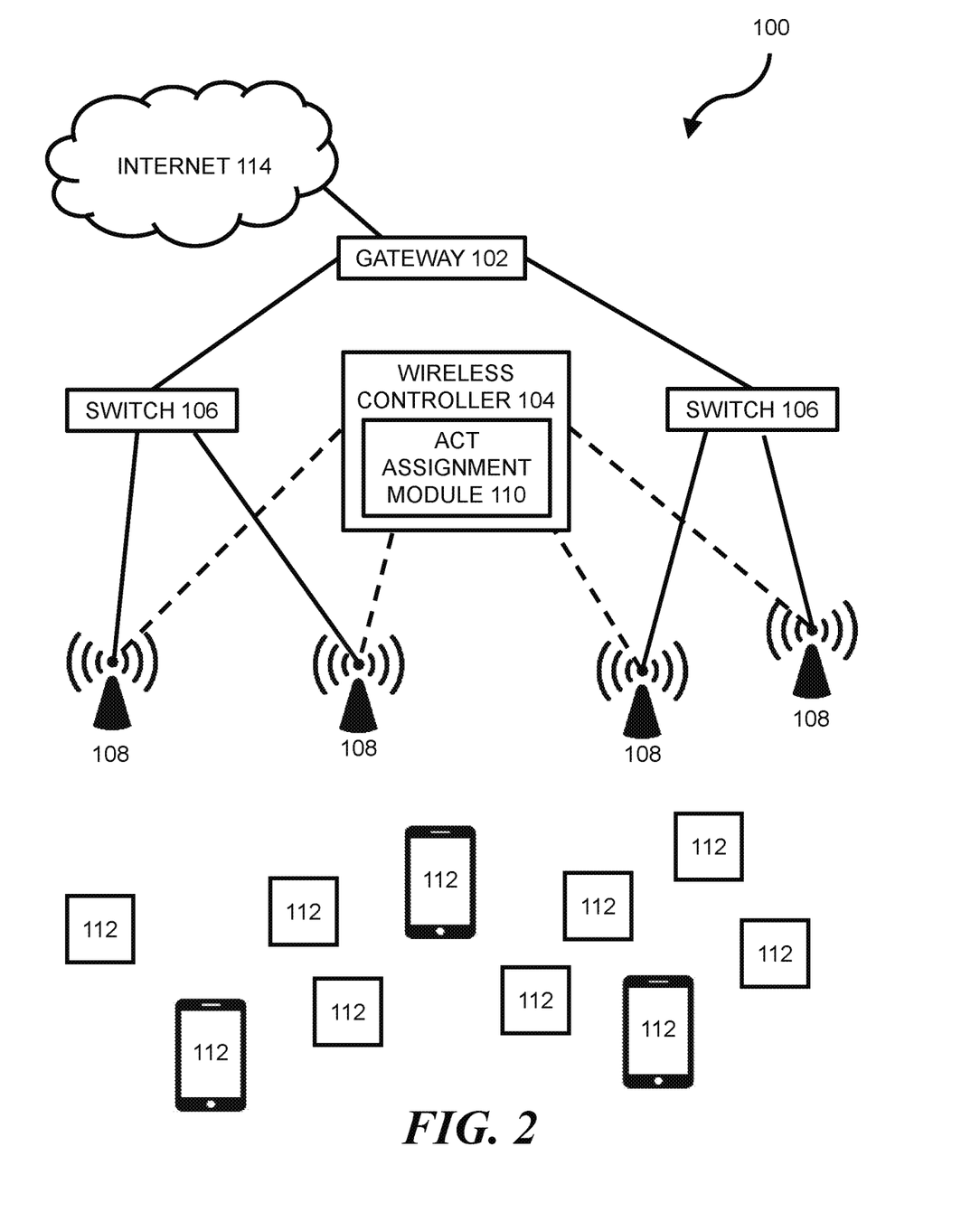
FIG. 2 is a diagram of a network environment including a wireless controller including an authentication control threshold assignment module, according to an example.

FIGS. 1 and 2 are diagrams of an example network environment 100 that includes a local area network portion including a gateway 102, a wireless controller 104, various switches 106, various APs 108, and various wireless devices 112. In environment 100 of FIG. 1, one of APs 108 includes an ACT assignment module 110 as described in further detail below, whereas in environment 100 of FIG. 2, wireless controller 104 includes ACT module 110. The structure and functionality of the various aspects of environment 100 are described in further detail below.

The terms "access point" or "AP" as used herein, can, for example, refer to a networking hardware device that allows a Wi-Fi compliant device to connect to a wired network. Such an AP 108 may be connected to an upstream wired device, such as switch 106, wireless controller 104, etc., via an Ethernet connection and may provide one or more downstream wireless connections using Radio Frequency (RF) links for other wireless devices to use a wired connection. AP 108 can support one or more industry standards for sending and receiving data using these radio frequencies, such as the Institute of Electrical and Electronics Engineers (IEEE) 802.11 standard or other suitable standards. AP 108 can, for example, be in the form of a standalone device connected to a gateway (e.g., gateway 102), router, or other intermediate datapath device. In some implementations, AP 108 may be an integral component of such an intermediate datapath device or other network equipment.

As used herein, the term "wireless controller" can, for example, refer to any suitable entity that handles control and management functions of a network or equipment thereof. For example, wireless controller 104 can be used to control one or more aspects of APs 108, such as channel assignment, beamforming, radio resource management (RRM), etc. In some implementations, applications can run on wireless controller 104 or on other devices on the network (or otherwise in communication with the network) to meet customer use cases, such as to achieve a desired throughput (or another Quality of Service (QoS)) over the network, enforce security provisions or access control policies for the network, or provide another suitable service or functionality.

In some implementations, wireless controller 104 can allow for the decoupling of traffic routing control decisions (e.g., which port of a given switch should be used to forward traffic to a given destination) from the network's physical infrastructure. For example, in some implementations, wireless controller 104 can be in the form of an SDN controller and switches 106 can be in the form of SDN-enabled switches that are within the control domain of the SDN controller. In some environments, one or more network nodes within environment 100 may be deemed to be "controlled" by another device, such as wireless controller 104. As used herein, the term "controlled" can, for example, refer to devices within the control domain of the wireless controller 104 or otherwise controllable by wireless controller 104. Such a controlled node can, for example, communicate with wireless controller 104 and can allow wireless controller 104 to manage the node in accordance with a protocol. For example, an OpenFlow-compatible switch controlled by a wireless controller 104 with SDN capabilities may permit controller 104 to add, update, and delete flow entries in flow tables of switch 106 using suitable commands.

In some network environments, a data packet may be routed from a given switch 106 to a given wireless device 112 through one or more data paths that may include wireless links (e.g., a wireless link between AP 108 and wireless device 112). For example, in some network environments, a data packet may be routed to wireless device 112 along a first datapath that uses a first AP 108 or alternatively along a second datapath that uses a second AP 108. A given data path for data packets within environment 100 can be determined by wireless controller 104 (or another entity, such as by a network administrator, by datapath nodes themselves, etc.) based on one or more static parameters (e.g., link speeds, number of hops between nodes, etc.) and can further (or alternatively) be based on one or more dynamic parameters (e.g., QoS, network latency, network throughput, network power consumption, etc.).

Network nodes within environment 100 can forward traffic along a datapath based on metadata within the traffic. For example, traffic in the form of a packet can be received at switch 106 (or another suitable intermediary network node). For consistency, the industry term "packet" is used throughout this description, however, it is appreciated that the term "packet" as used herein can refer to any suitable protocol data unit (PDU). Such a packet can, for example, include payload data as well as metadata in the form of control data. Control data can, for example, provide data to assist the network node with reliably delivering payload data. For example, control data can include network addresses for source and destination nodes (e.g., wireless device 112), error detection codes, sequencing information, packet size of the packet, a time-to-live (TTL) value, etc. In contrast, payload data can include data carried on behalf of an application for use by source and destination nodes.

The functionality of wireless controller 104 or other network equipment within environment 100 can, for example, be implemented in part via a software program on a standalone machine, such as a standalone server. In some implementations, wireless controller 104 can be implemented on one or more multi-purpose machines, such as a suitable desktop computer, laptop, tablet, or the like. In some implementations, wireless controller 104 can be implemented on a suitable non-host network node, such as certain types of network switches. In some implementations, the functionality of wireless controller 104 can be implemented within the hardware and software of an AP (e.g., AP 108). It is appreciated that the functionality of wireless controller 104 may be split among multiple controllers or other devices. For example, environment 100 is described and illustrated as including only one wireless controller 104. However, it is appreciated that the disclosure herein can be implemented in networks with multiple controllers. For example, in some networks, network devices are in communication with multiple controllers such that control of the network can be smoothly handed over from a first controller to a second controller if a first controller fails or is otherwise out of operation. In some implementations, or more wireless controllers 104 can operate in a distributed fashion over multiple appliances but present themselves as a single entity to the network.

As another example, multiple controllers can be used to work together to concurrently control certain networks. In such networks, a first controller can, for example, control certain network devices while a second controller can control other network devices. In view of the above, reference in this application to a single wireless controller 104 that controls the operation of network devices in environment 100 is intended to also include such multiple controller configurations (and other suitable multiple controller configurations).

Wireless devices 112 can, for example, be in the form of network hosts or other types of network nodes. Wireless devices 112 are depicted as mobile phones and as a generic wireless device, such as an IOT sensor, in FIGS. 1 and 2, however such clients can be in the form of any suitable device that can transmit and receive wireless data with an AP 108. For example, in some implementations, wireless devices 112 can be in the form of suitable mobile phones, tablets, laptops, servers, desktop computers, printers, APs, wireless sensors, beacons, Internet of Things (IOT) devices, wireless clients, etc. In certain implementations, one or more wireless devices 112 can be in the form of a desktop computer including a monitor for presenting information to an operator and a keyboard and mouse for receiving input from an operator and one or more wireless devices 112 can be in the form of smart phones. It is appreciated that wireless devices 112 can be endpoint nodes of environment 100 (such as depicted in FIGS. 1 and 2), intermediate nodes between endpoint nodes, or positioned at other logical or physical locations within environment 100.

Various intermediary nodes within the network environment can, for example, be in the form of switches (e.g., switches 106) or other multi-port network bridges that process and forward data at the data link layer. In some implementations, one or more of the nodes can be in the form of multilayer switches that operate at multiple layers of the Open Systems Connection (OSI) model (e.g., the data link and network layers). Although the term "switch" is used throughout this description, it is appreciated that this term can refer broadly to other suitable network data forwarding devices. For example, a general purpose computer can include suitable hardware and machine-readable instructions that allow the computer to function as a network switch. It is appreciated that the term "switch" can include other network datapath elements in the form of suitable routers, gateways and other devices that provide switch-like functionality for the network. Gateway 102 can, for example, be in the form of a network node that acts as an entrance to another network, such as Internet 114 or another suitable Wide Area Network (WAN) or Local Area Network (LAN).

The various nodes within network environment 100 are connected via one or more data channels (shown in solid lines), which can, for example be in the form of data cables or wireless data channels. Although a single link (i.e., a single line in FIGS. 1 and 2) between each network node is illustrated, it is appreciated that each single link may include multiple wires or other wired or wireless data channels. Moreover, FIGS. 1 and 2 further depict wireless controller 104 as being connected to APs 108 via broken lines, which is intended to illustrate logical control channels between wireless controller 104 and APs 108. However, it is appreciated that wireless controller 104 may be directly connected to only one or a few APs, while being indirectly connected to other nodes of the network. For example, wireless controller 104 can be directly connected to a first AP via an Ethernet cable, while being indirectly connected to a second AP (e.g., by relying on the first AP to wireless communicate to the second AP control signals for the second AP or via a wired connection between the first and second APs). In certain implementations, the functionality and/or equipment for wireless controller 104 can reside within Internet 114 or another network.

In the example environment 100 depicted in FIGS. 1 and 2, the various network nodes are in the form of intermediary nodes (e.g., switches 106, gateway 102, APs 108), a controller node (e.g., wireless controller 104), and host devices (wireless devices 112). It is appreciated however, that the implementations described herein can be used or adapted for networks including more or fewer devices, different types of devices, and different network arrangements. As an example, in some implementations, wireless controller 104 may operate as an intermediary node or a host device. As another example, in some implementations, such as in certain mesh networks, a backhaul of the network may be wireless instead of wired. In such an implementation, an AP may wirelessly relay data to another AP that is connected to the wired backbone, to thereby use a wireless link between two APs as a wireless backhaul.

Figure 3:
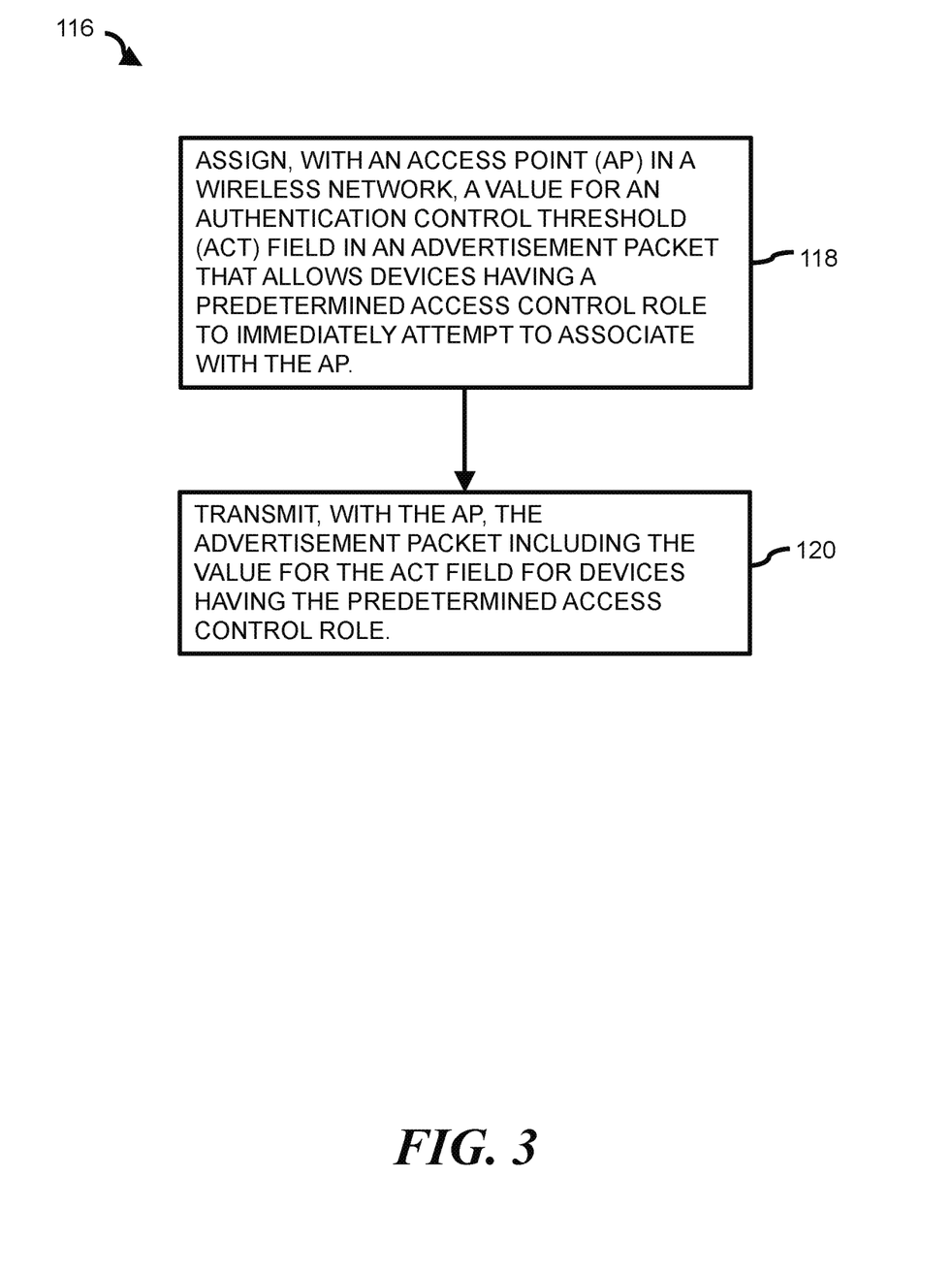
FIG. 3 is a flowchart for a method, according to an example.

FIG. 3 illustrates a flowchart for an example method 116. For illustration, the description of method 116 and its component operations make reference to the example network environment 100 of FIGS. 1 and 2 and elements thereof, such as for example APs 108, wireless devices 112, etc. Moreover, network environment 100 of FIGS. 1 and 2 depicts four APs 108 and 10 wireless devices 112. However, it is appreciated that method 116 or aspects thereof can be used or otherwise applicable for any suitable network or network element described herein or otherwise. For example, method 116 can be applied to an environment 100 with a different number or arrangement of APs 108, wireless devices 112, and other network equipment.

In some implementations, method 116 can be implemented or otherwise executed through the use of executable instructions stored on a memory resource (e.g., the memory resource of the computing device of FIG. 7), executable machine readable instructions stored on a storage medium (e.g., the medium of FIG. 8), in the form of electronic circuitry (e.g., on an Application-Specific Integrated Circuit (ASIC)), and/or another suitable form. Although the description of method 116 herein primarily refers to operations performed on AP 108 for purposes of illustration, it is appreciated that in some implementations, method 116 can be executed on another computing device within network environment 100 (e.g., wireless controller 104) or in data communication with network environment 100. In some implementations, method 116 can be executed on network devices in parallel (e.g., in a distributed computing fashion).

Method 116 includes assigning (at block 118) with AP 108, a value for an ACT field in an advertisement packet that allows devices 112 having a predetermined access control role to immediately attempt to associate with AP 108. In some implementations, the value for the ACT field can, for example, be a maximum value for the ACT field. For example, the maximum value can, for example, be 1022, or another suitable maximum value for a given ACT field.

The term "access control roles", as used herein, can, for example, refer to roles related to allowing access to systems or other resources. For example, a first role may be associated with a security policy that allows access to certain highly sensitive servers or resources, while a second role may have more limited access to sensitive servers or resources. In some implementations, an access control role for certain devices (e.g., temperature sensors), may be associated with a security policy that provides more limited access rights compared to an access control role for devices such as laptops, tablets, and smartphones.

In some implementations, the predetermined access control role can, for example, be an access control role for IOT devices. As used herein, the terms IOT and "Internet of Things" can, for example, refer to physical objects, such as devices, vehicles, buildings, etc., that can, for example, be embedded with electronics, software, sensors, actuators, and network connectivity to enable the objects to collect and exchange data. Such objects may be referred to as "connected" devices or "smart" or the like.

In some implementations, an access control role for IOT devices can, for example, be a Role-Based Access Control (RBAC) role for IOT devices. As used herein, the terms "Role-Based Access Control" and "RBAC" can, for example refer to an access control model that restricts system access to authorized users based on roles and privileges. Components of RBAC can include role-permissions, user-role and role-role relationships which can be used to perform user assignments. In some implementations, devices having an IOT RBAC role may be limited to those compliant with the IEEE 802.11ah wireless networking protocol. In some implementations, the determination of whether a device qualifies for an IOT RBAC role is based on criteria indicating that the device is an IOT device.

In some implementations, the access control role is a role based on attributes in an Attribute-Based Access Control (ABAC) model. As used herein, the terms "Attribute-Based Access Control" and "ABAC" Attribute-based access control (ABAC) can, for example, refer to an access control model that grants access rights to users through the use of policies that combine attributes together. Such policies can, for example, use any type of attributes (user attributes, resource attributes, object, environment attributes etc.) and rules about who is making the request, the resource, and the action. In some implementations, the determination of whether a device qualifies for an IOT ABAC role is based on criteria indicating that the device is an IOT device.

In some implementations, assigning a value for the ACT field allows devices having a predetermined access control role to immediately attempt to associate with the AP without the use of an additional Information Element (IE). In such implementations, the ACT fields may be enough to influence the device to immediately attempt to associate with the AP without reliance on other IEs within a beacon packet or other packets or instructions.

Method 116 includes transmitting (at block 120), with AP 108, the advertisement packet including the value for the ACT field for devices having the predetermined access control role. As used herein, the term "advertisement packet" can, for example refer to a packet, frame, or other data element transmitted to announce the presence of a wireless LAN. Such packets can, for example, be transmitted periodically and can, for example, be in the form of a management frame for an IEEE 802.11 based WLANs. Such packets can, for example, be transmitted by an AP 108 in an infrastructure Basic Service Set (BSS), with network beacon generation being distributed among several APs 108.

It is appreciated that one or more operations of method 116 can be performed periodically. For example, in some implementations, one or more of blocks 118 and 120 (or other operations described herein) may be performed periodically. The various period times for blocks 118 and 120 (or other operations described herein) may be the same or different times. For example, in some implementations, the period of block 118 is every 30 seconds and the period of block 120 is every 1 minute. It is further appreciated, that the period for a given block may be regular (e.g., every 1 minute) or may be irregular (e.g., every 1 minute during a first network condition, and every 2 minutes during a second network condition). In some implementations, one or more of block 118 and 120 (or other operations described herein) may be non-periodic and may be triggered by some network or other event.

Although the flowchart of FIG. 3 shows a specific order of performance, it is appreciated that this order may be rearranged into another suitable order, may be executed concurrently or with partial concurrence, or a combination thereof. Likewise, suitable additional and/or comparable operations may be added to method 116 or other methods described herein in order to achieve the same or comparable functionality. In some implementations, one or more operations are omitted. For example, in some implementations, block 118 of assigning an ACT field value can be omitted from method 116 or performed by a different device, such as wireless controller 104. It is appreciated that blocks corresponding to additional or alternative functionality of other implementations described herein can be incorporated in method 116. For example, blocks corresponding to the functionality of various aspects of implementations otherwise described herein can be incorporated in method 116 even if such functionality is not explicitly characterized herein as a block in method 116.

Figure 4:
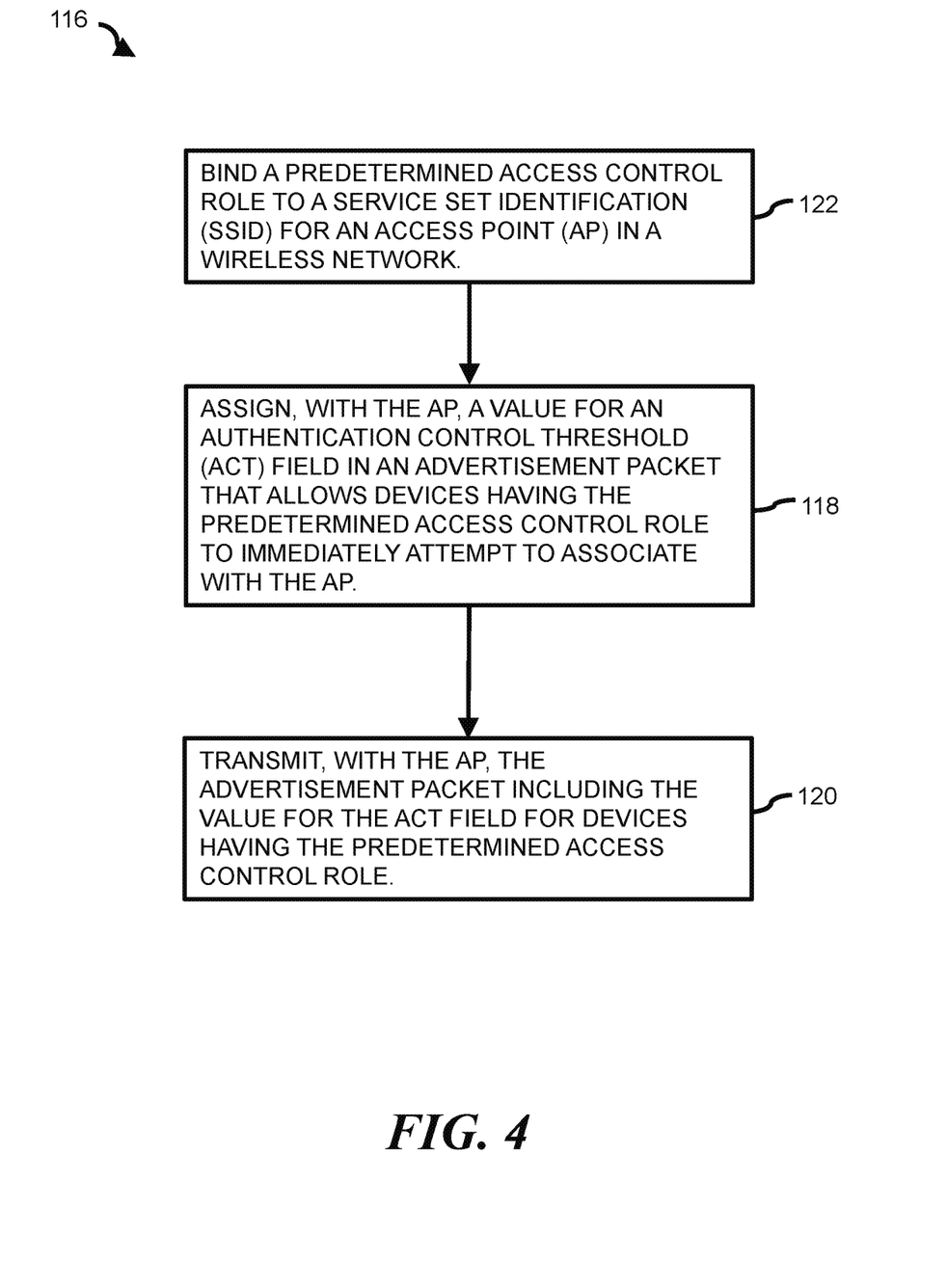
FIG. 4 is a flowchart for a method, according to another example.

FIG. 4 illustrates another example of method 116 in accordance with the present disclosure. For illustration, FIG. 4 reproduces various blocks from method 116 of FIG. 3, however it is appreciated that method 116 of FIG. 4 can include additional, alternative, or fewer operations, functionality, etc., than method 116 of FIG. 3 and is not intended to be limited by the diagram of FIGS. 1 and 2 (or vice versa) or the related disclosure thereof. It is further appreciated that method 116 of FIG. 4 can incorporate one or more aspects of method 116 of FIG. 3 and vice versa. For example, in some implementations, method 116 of FIG. 3 can include the additional operation described below with respect to method 116 of FIG. 4.

Method 116 of FIG. 4 includes binding (at block 122) the predetermined access control role to a Service Set Identification (SSID) for AP 108. The SSID can, for example, be an Extended SSID (ESSID). In some implementations, the predetermined access control role can be bound to a first SSID for an AP 108 but not bound to a second SSID for the AP. Likewise, it is appreciated that in some implementations, the predetermined access control role can be bound to suitable different SSIDs for the same AP 108 or for different APs 108.

Figure 5:
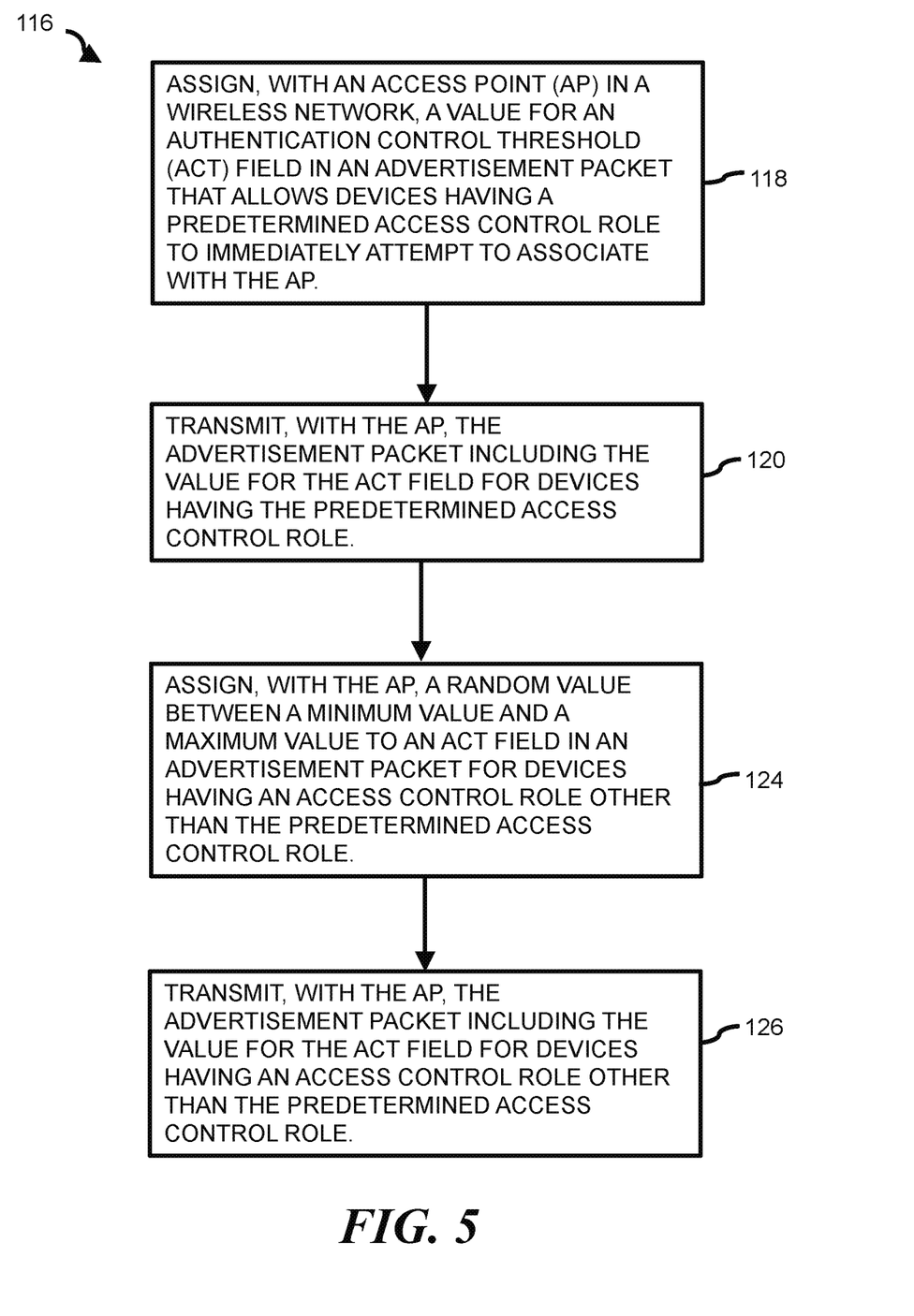
FIG. 5 is a flowchart for a method, according to another example.

FIG. 5 illustrates another example of method 116 in accordance with the present disclosure. For illustration, FIG. 5 reproduces various blocks from method 116 of FIG. 3, however it is appreciated that method 116 of FIG. 5 can include additional, alternative, or fewer operations, functionality, etc., than method 116 of FIG. 3 and is not intended to be limited by the diagram of FIGS. 1 and 2 (or vice versa) or the related disclosure thereof. It is further appreciated that method 116 of FIG. 5 can incorporate one or more aspects of method 116 of FIG. 3 and vice versa. For example, in some implementations, method 116 of FIG. 5 can include the additional operation described below with respect to method 116 of FIG. 3.

Method 116 of FIG. 5 includes assigning (at block 124), with AP 108, a random value between a minimum value and a maximum value to an ACT field in an advertisement packet for devices having an access control role other than the predetermined access control role. For example, in implementations where the predetermined access control role is an IOT access control role, the access control role "other than the predetermined access control role" can be an access control role for non IOT devices. It is appreciated that in some implementations, any suitable access control roles may be used for devices within environment 100. For example, in some implementations, the predetermined access control role may not be an IOT access control role and the role "other than the predetermined access control role" may be an IOT access control role.

As used herein, the term "random" as used herein with respect to a random value between a minimum value and a maximum value can, for example, refer to a number generated by a suitable pseudo- or quasi-random number generator. In some environments, the minimum value can, in some implementations, be 0 and the maximum value can, for example, be 1022. As a result of such a random value for the ACT field, devices having a role other than the predetermined access control role may attempt to associate with AP 108 at a random time within a given time window rather than immediately.

Method 116 of FIG. 5 includes transmitting (at block 126), with AP 108, the advertisement packet including the random value for the ACT field for devices having an access control role other than the predetermined access control role. It is appreciated that block 126 can incorporate one or more aspects of transmitting block 120 of method 116 of FIG. 3. For example, in some implementations, the advertisement packet can be transmitted periodically and can, for example, be in the form of a management frame for an IEEE 802.11 based WLANs.

Figure 6:
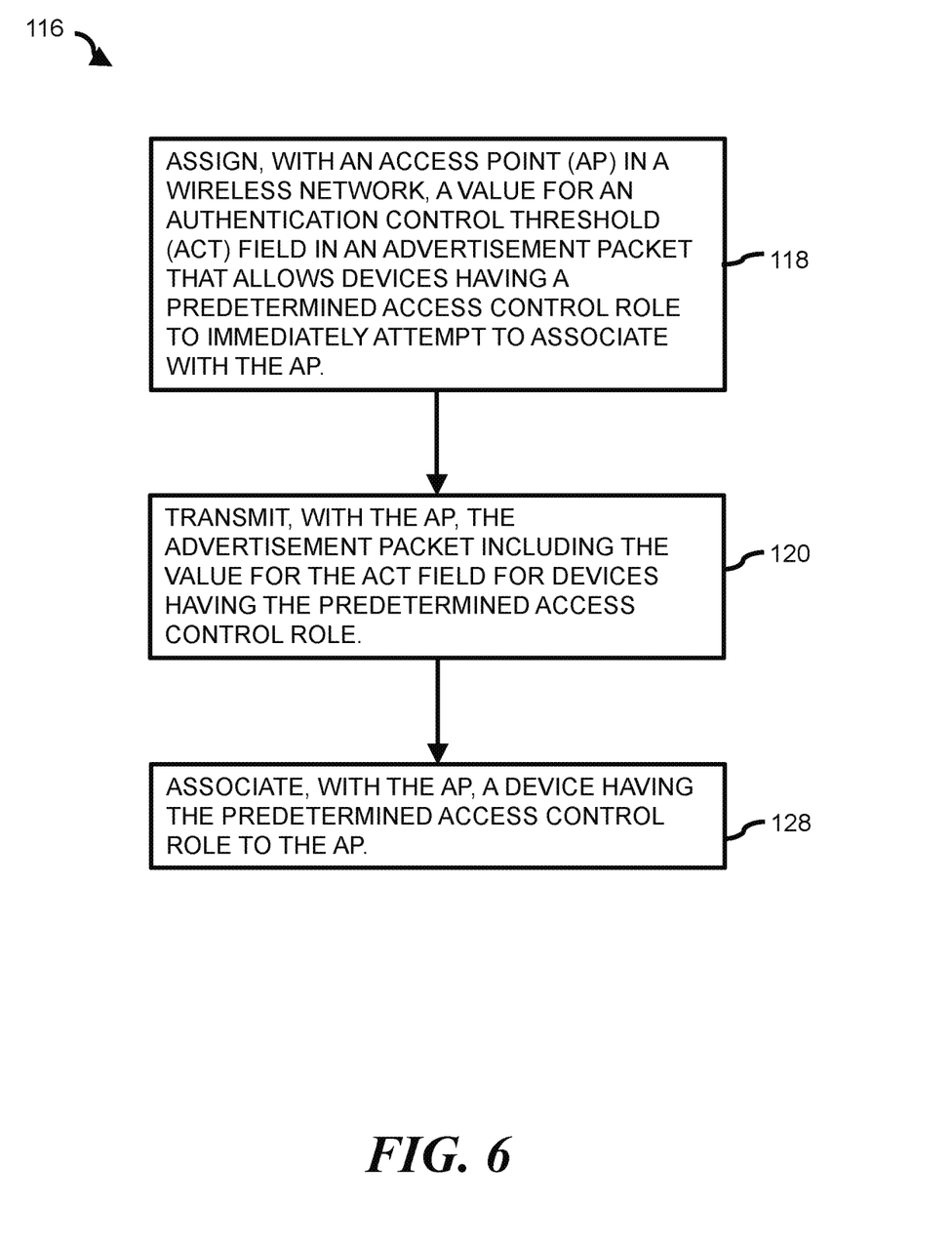
FIG. 6 is a flowchart for a method, according to another example.

FIG. 6 illustrates another example of method 116 in accordance with the present disclosure. For illustration, FIG. 6 reproduces various blocks from method 116 of FIG. 6, however it is appreciated that method 116 of FIG. 6 can include additional, alternative, or fewer operations, functionality, etc., than method 116 of FIG. 6 and is not intended to be limited by the diagram of FIGS. 1 and 2 (or vice versa) or the related disclosure thereof. It is further appreciated that method 116 of FIG. 6 can incorporate one or more aspects of method 116 of FIG. 3 and vice versa. For example, in some implementations, method 116 of FIG. 6 can include the additional operation described below with respect to method 116 of FIG. 3.

Method 116 of FIG. 6 includes associating (at block 128), with AP 108, a device having the predetermined access control role to the AP. In some implementations, during association between the device and AP 108, the device can send an SSID, Media Access Control (MAC) address, and security settings to the AP to be checked by AP 108. In some implementations, once the device is associated with AP 108, the device may access the network. It is appreciated that in some implementations, method 116 may include authentication of the device in additional to association of the device. Authentication can, for example, occur prior to association of the device or at another suitable time. In such an authentication process, the device can, for example, provide proof of identity to AP 108 or another entity to ensure that the device is allowed access the network.

Various example implementations for the present disclosure will now be described. It is appreciated that these examples may include or refer to certain aspects of other implementations described herein (and vice-versa), but are not intended to be limiting towards other implementations described herein. Moreover, it is appreciated that certain aspects of these implementations may be applied to other implementations described herein.

In some specific implementations, wireless devices 112 (e.g., WIFI-IOT sensor stations in this example) may be quickly associated with an AP 108 by modifying the ACT field of an IEEE 802.11ah Beacon Packet. When such a wireless device boots up and is initialized, it can, for example, generate a random value within a range from 0 to 1022. After the wireless device receives an IEEE 802.11ah beacon packet, the wireless service may try to associate with AP 108 if its value is less than the ACT. Otherwise the device may postpone authentication attempts until a subsequent beacon packet is received from AP 108.

In accordance with certain implementations of the present disclosure, an authentication request packet for a wireless device is snooped to determine whether it contains an ACT field for an IEEE 802.11ah information element. If it is determined that the authentication request packet contains such a field, then the device may, in some implementations, be considered a mission-critical station as opposed to a normal client and AP 108 or another entity (e.g., wireless controller 104 in some implementations) may hard-code a value of 1022 for the beacons from thereon for the wireless device. As a result, setting the ACT field to a maximum of 1022 will cause the wireless device to attempt to associate instantaneously as the random value between 0 and 1022 will be less than or equal to the maximum value of 1022. By allowing certain devices such as IEEE 802.11ah WIFI IOT sensors to attempt to associate immediately, certain implementations of the present disclosure may suppress additional probe request packets from the devices, which may improve airtime utilization. In some examples, overhead related to sending IEEE 802.11 Control and Management Packets (e.g., probe requests) may therefore be reduced.

Figure 7:
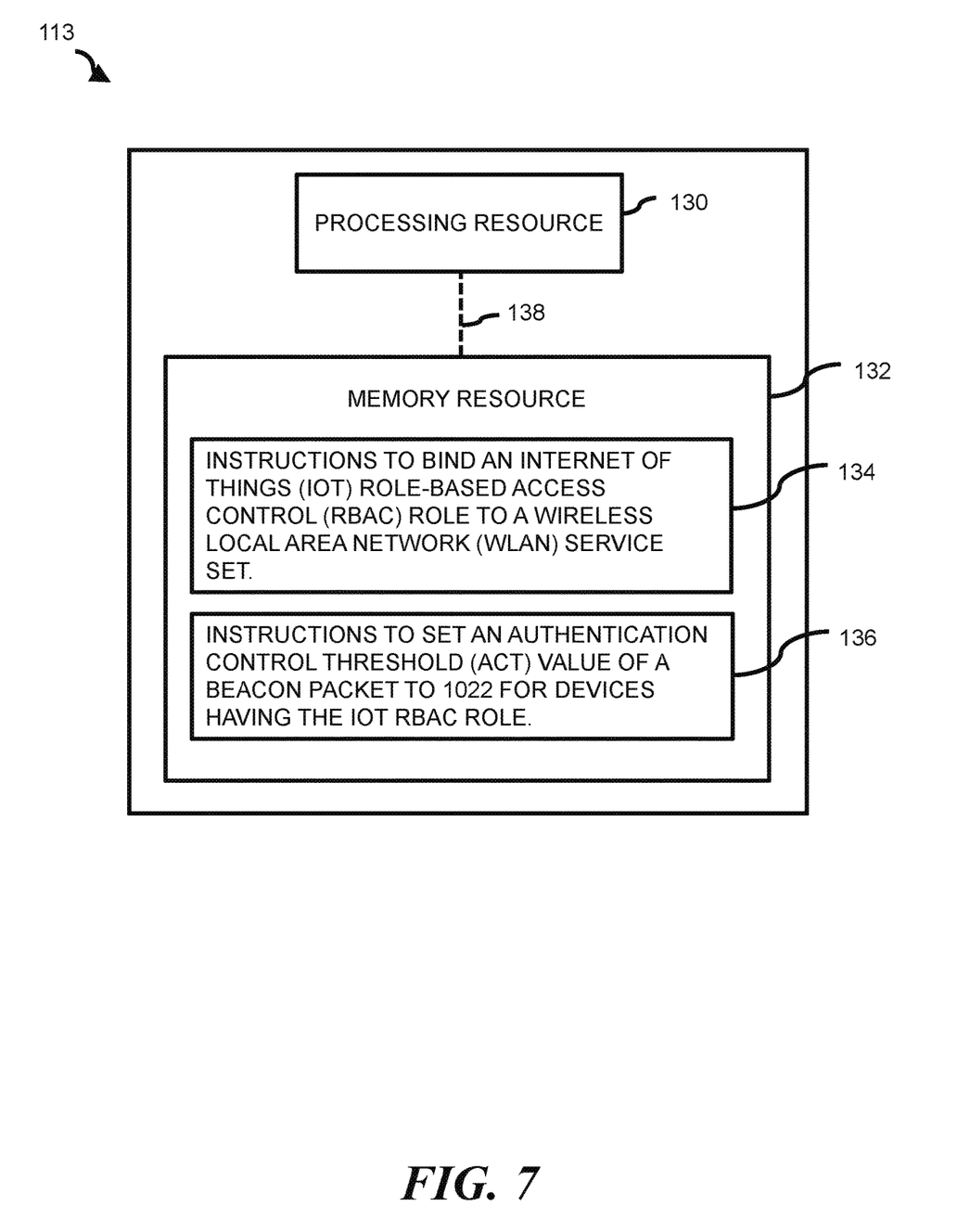
FIG. 7 is a diagram of a computing device, according to an example.

FIG. 7 is a diagram of a computing device 113 in accordance with the present disclosure. Computing device 113 can, for example, be in the form of an AP (e.g., AP 108), a wireless controller (e.g., wireless controller 104), or another suitable computing device within network environment 100 or in communication with network environment 100 or equipment thereof. In some implementations, the computing device can be a wireless controller 104 integrated in AP 108. In some implementations, computing device 113 is a wireless controller device (e.g., wireless controller 104) that is separate from AP 108. As described in further detail below, computing device 113 includes a processing resource 130 and a memory resource 132 that stores machine-readable instructions 134 and 136. For illustration, the description of computing device 113 makes reference to various aspects of the diagrams of FIGS. 1 and 2 as well as method 116 of FIGS. 3-6. However it is appreciated that computing device 113 can include additional, alternative, or fewer aspects, functionality, etc., than the implementations described elsewhere herein and is not intended to be limited by the related disclosure thereof.

Instructions 134 stored on memory resource 132 are, when executed by processing resource 130, to cause processing resource 130 to bind an IOT RBAC role to a WLAN service set. Instructions 134 can incorporate one or more aspects of blocks of method 116 or another suitable aspect of other implementations described herein (and vice versa). For example, in some implementations, devices having the IOT RBAC role are compliant with the IEEE 802.11ah wireless networking protocol.

Instructions 136 stored on memory resource 132 are, when executed by processing resource 130, to cause processing resource 130 to set an ACT value of a beacon packet to 1022 for devices having the IOT RBAC role. Instructions 136 can incorporate one or more aspects of blocks of method 116 or another suitable aspect of other implementations described herein (and vice versa). For example, such a value for the ACT field may allow devices having a predetermined access control role to immediately attempt to associate with AP 108.

Processing resource 130 of computing device 113 can, for example, be in the form of a central processing unit (CPU), a semiconductor-based microprocessor, a digital signal processor (DSP) such as a digital image processing unit, other hardware devices or processing elements suitable to retrieve and execute instructions stored in memory resource 132, or suitable combinations thereof. Processing resource 130 can, for example, include single or multiple cores on a chip, multiple cores across multiple chips, multiple cores across multiple devices, or suitable combinations thereof. Processing resource 130 can be functional to fetch, decode, and execute instructions as described herein. As an alternative or in addition to retrieving and executing instructions, processing resource 130 can, for example, include at least one integrated circuit (IC), other control logic, other electronic circuits, or suitable combination thereof that include a number of electronic components for performing the functionality of instructions stored on memory resource 132. The term "logic" can, in some implementations, be an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Processing resource 130 can, for example, be implemented across multiple processing units and instructions may be implemented by different processing units in different areas of computing device 113.

Memory resource 132 of computing device 113 can, for example, be in the form of a non-transitory machine-readable storage medium, such as a suitable electronic, magnetic, optical, or other physical storage apparatus to contain or store information such as machine-readable instructions 134 and 136. Such instructions can be operative to perform one or more functions described herein, such as those described herein with respect to method 116 or other methods described herein. Memory resource 132 can, for example, be housed within the same housing as processing resource 130 for computing device 113, such as within a computing tower case for computing device 113 (in implementations where computing device 113 is housed within a computing tower case). In some implementations, memory resource 132 and processing resource 130 are housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, memory resource 132 can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that both machine-readable instructions as well as related data can be stored on memory mediums and that multiple mediums can be treated as a single medium for purposes of description.

Memory resource 132 can be in communication with processing resource 130 via a communication link 138. Each communication link 138 can be local or remote to a machine (e.g., a computing device) associated with processing resource 130. Examples of a local communication link 138 can include an electronic bus internal to a machine (e.g., a computing device) where memory resource 132 is one of volatile, non-volatile, fixed, and/or removable storage medium in communication with processing resource 130 via the electronic bus.

In some implementations, one or more aspects of computing device 113 (e.g., AP 108, wireless controller 104, or other devices of a wireless network) can be in the form of functional modules that can, for example, be operative to execute one or more processes of instructions 134 or 136 or other functions described herein relating to other implementations of the disclosure. As used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software can include hardware only (i.e., a hardware element with no software elements), software hosted at hardware (e.g., software that is stored at a memory and executed or interpreted at a processor), or hardware and software hosted at hardware. It is further appreciated that the term "module" is additionally intended to refer to one or more modules or a combination of modules. Each module of computing device 113 can, for example, include one or more machine-readable storage mediums and one or more computer processors.

In view of the above, it is appreciated that the various instructions of computing device 113 described above can correspond to separate and/or combined functional modules. For example, instructions 136 can correspond to an "ACT assignment module" (e.g., module 110 of FIGS. 1 and 2) to set an ACT value of a beacon packet to 1022 for devices having the IOT RBAC role. Likewise, instructions 134 can correspond to an RBAC binding module to bind an IOT RBAC role to a WLAN service set. It is further appreciated that a given module can be used for multiple functions. As but one example, in some implementations, a single module can be used to both bind an RBAC role to a WLAN service set (e.g., corresponding to the functionality of instructions 134) as well as to set an ACT value of a beacon packet to 1022 for devices having the IOT RBAC role (e.g., corresponding to the functionality of instructions 136).

One or more nodes within the network environment 100 (e.g., wireless controller 104, AP 108, etc.) can further include a suitable communication module to allow networked communication between network equipment. Such a communication module can, for example, include a network interface controller having an Ethernet port and/or a Fibre Channel port. In some implementations, such a communication module can include wired or wireless communication interface, and can, in some implementations, provide for virtual network ports. In some implementations, such a communication module includes hardware in the form of a hard drive, related firmware, and other software for allowing the hard drive to operatively communicate with other hardware of wireless controller 104, AP 108, or other network equipment. The communication module can, for example, include machine-readable instructions for use with communication the communication module, such as firmware for implementing physical or virtual network ports.

Figure 8:
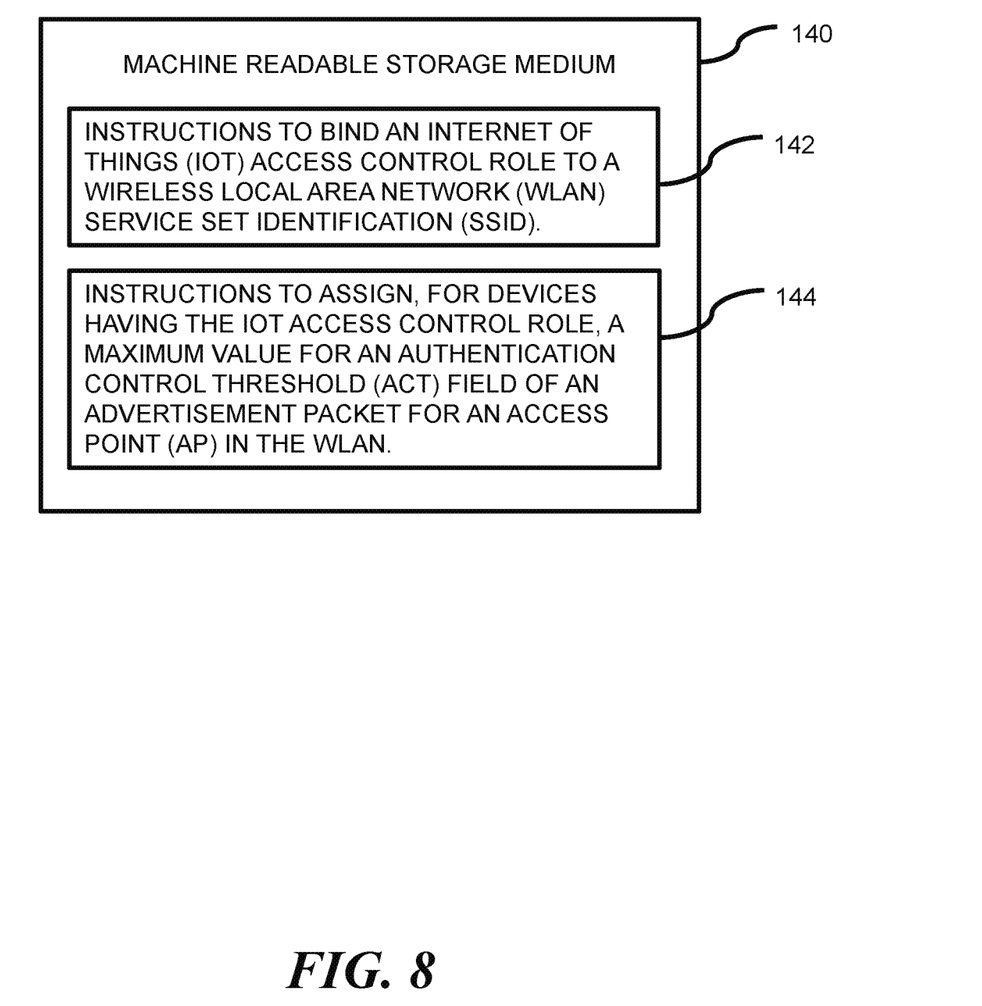
FIG. 8 is a diagram of machine-readable storage medium, according to an example.

FIG. 8 illustrates a machine-readable storage medium 140 including various instructions that can be executed by a computer processor or other processing resource. In some implementations, medium 140 can be housed within an AP, such as AP 108, a wireless controller, such as wireless controller 104, or on another computing device within network environment 100 or in local or remote wired or wireless data communication with network environment 100. For illustration, the description of machine-readable storage medium 140 provided herein makes reference to various aspects of computing device 113 (e.g., processing resource 130) and other implementations of the disclosure (e.g., method 116). Although one or more aspects of computing device 113 (as well as instructions such as instructions 134 and 136) can be applied to or otherwise incorporated with medium 140, it is appreciated that in some implementations, medium 140 may be stored or housed separately from such a system. For example, in some implementations, medium 140 can be in the form of Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof.

Medium 140 includes machine-readable instructions 142 stored thereon to cause processing resource 130 to bind an IOT access control role to a WLAN SSID. Instructions 142 can, for example, incorporate one or more aspects of block 122 of method 116 or another suitable aspect of other implementations described herein (and vice versa).

Medium 140 includes machine-readable instructions 144 stored thereon to cause processing resource 130 to assign, for devices having the IOT access control role, a maximum value for an ACT field of an advertisement packet for an AP in the WLAN. Instructions 144 can, for example, incorporate one or more aspects of block 118 of method 116 or another suitable aspect of other implementations described herein (and vice versa). For example, in some implementations, the maximum value for the ACT field is to allow devices with the IOT access control role to attempt to immediately associate with the AP.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

As used herein, "logic" is an alternative or additional processing resource to perform a particular action and/or function, etc., described herein, which includes hardware, e.g., various forms of transistor logic, application specific integrated circuits (ASICs), etc., as opposed to machine executable instructions, e.g., software firmware, etc., stored in memory and executable by a processor. Further, as used herein, "a" or "a number of" something can refer to one or more such things. For example, "a number of widgets" can refer to one or more widgets. Also, as used herein, "a plurality of" something can refer to more than one of such things.

What is claimed is:

1. A method comprising:
    binding a predetermined access control role for Internet of Things (IoT) devices to a Service Set Identification (SSID) for a Access Point (AP) in a wireless network;
    upon a condition causing a plurality of devices to attempt to associate with the AP, assigning, with the AP, a first value for an Authentication Control Threshold (ACT) field in a first advertisement packet to allow the IoT devices having the predetermined access control role to immediately attempt to associate with the AP, the first value being a maximum value for the ACT field;
    transmitting, with the AP, the first advertisement packet including the first value for the ACT field for association of IoT devices having the predetermined access control role;
    receiving authentication requests from one or more IoT devices in response to the first advertisement packet and associating the one or more IoT devices with the AP;
    assigning, with the AP, a second value between a minimum value and a maximum value to an ACT field in a second advertisement packet for one or more devices having an access control role other than the predetermined access control role for IoT devices;
    transmitting, with the AP, the second advertisement packet including the second value for the ACT field for one or more devices having an access control role other than the predetermined access control role allowing one or more devices having an access control role other than the predetermined access control role to attempt association with the AP within a random time in a given time window; and
    receiving authentication requests from one or more devices in response to the second advertisement packet and associating the one or more devices with the AP.

2. The method of claim 1, wherein the maximum value is 1022.

3. The method of claim 1, wherein the access control role is a Role-Based Access Control (RBAC) role for IoT devices.

4. The method of claim 1, wherein the access control role is a role based on attributes of IoT devices in an Attribute-Based Access Control (ABAC) model.

5. The method of claim 1, wherein assigning a value for the ACT field allows IoT devices having the predetermined access control role to immediately attempt to associate with the AP without the use of an additional Information Element (IE).

6. A non-transitory machine readable storage medium having stored thereon machine readable instructions to cause a computer processor to:
    bind a predetermined access control role for Internet of Things (IOT) devices to a Service Set Identification (SSID) associated with an Access Point (AP) in a Wireless Local Area Network (WLAN); and
    upon a condition causing a plurality of devices to attempt to associate with the AP, assign, with the AP, a first value for an Authentication Control Threshold (ACT) field of a first advertisement packet for the AP in the WLAN to allow the IoT devices to immediately attempt to associate with the AP, the first value being a maximum value for the ACT field;
    transmit, with the AP, the first advertisement packet including the first value for the ACT field for association of IoT devices having the predetermined access control role;
    receive authentication requests from one or more IoT devices in response to the first advertisement packet and associate the one or more IoT devices with the AP;
    assign, with the AP, a second value between a minimum value and a maximum value to an ACT field in a second advertisement packet for one or more devices having an access control role other than the predetermined access control role for IoT devices;
    transmit, with the AP, the second advertisement packet including the second value for the ACT field for one or more devices having an access control role other than the predetermined access control role allowing one or more devices having an access control role other than the predetermined access control role to attempt association with the AP within a random time in a given time window; and
    receive authentication requests from one or more devices in response to the second advertisement packet and associate the one or more devices with the AP.

7. An Access Point (AP) in a wireless network, the AP comprising:
    a processing resource; and
    a memory resource storing machine readable instructions to cause the processing resource to:
        bind a predetermined Internet of Things (IoT) Role-Based Access Control (RBAC) role for IoT devices to Service Set Identification (SSID) for a Access Point (AP) in a Wireless Local Area Network (WLAN);
        upon a condition causing a plurality of devices to attempt to associate with the AP, set, with the AP, a first values for an Authentication Control Threshold (ACT) field of a first beacon packet to allow the IoT devices having the predetermined IoT RBAC role to immediately attempt to associate with the AP, the first value being a maximum value for the ACT field;
        transmit, with the AP, the first beacon packet including the first value for the ACT field for association of IoT devices having the predetermined IoT RBAC role;
        receive authentication requests from one or more IoT devices in response to the first beacon packet and associate the one or more IoT devices with the AP;
        set an ACT value of a subsequent second beacon packet to a value other than the maximum value for one or more devices that do not have the predetermined IOT RBAC role to delay attempted association of those devices with the AP;
        transmit, with the AP, the second beacon packet including the second value for the ACT field for one or more devices that do not have the predetermined IOT RBAC role to attempt association with the AP within a random time in a given time window; and
        receive authentication requests from one or more devices in response to the second beacon packet and associate the one or more devices with the AP.

8. The AP of claim 7, wherein a device having the predetermined IOT RBAC role is compliant with the Institute of Electrical and Electronics Engineers (IEEE) 802.11ah wireless networking protocol.

9. The method of claim 1, wherein the SSID is an Extended SSID (ESSID).

10. The method of claim 1, wherein a plurality of SSIDs are associated with the AP, and the SSID to which the predetermined access control role is bound comprises only a first SSID of the plurality of SSIDs.

11. The method of claim 1, wherein the condition causing the plurality of devices to attempt to associate with the AP is a power outage event.

12. The medium of claim 6, wherein the condition causing the plurality of devices to attempt to associate with the AP is a power outage event.

13. The AP of claim 7, wherein the condition causing the plurality of devices to attempt to associate with the AP is a power outage event.

\* \* \* \* \*